United States Patent [19]
Takeuchi et al.

[11] Patent Number: 5,664,083
[45] Date of Patent: Sep. 2, 1997

[54] GRAPHIC DISPLAY APPARATUS

[75] Inventors: Munetaka Takeuchi; Takefumi Namiki; Kouzo Nagano; Ikuo Fukuda, all of Kawasaki; Hiromi Hayashi, Aomori, all of Japan

[73] Assignee: Fujitsu Limited, Kawasaki, Japan

[21] Appl. No.: 524,183

[22] Filed: Sep. 6, 1995

[30] Foreign Application Priority Data

Dec. 6, 1994 [JP] Japan ................................. 6-302267

[51] Int. Cl.⁶ .......................................... G06F 15/00
[52] U.S. Cl. .......................................... 345/437
[58] Field of Search ...................... 395/137, 133; 382/296, 293; 345/121, 126

[56] References Cited

U.S. PATENT DOCUMENTS

5,572,639  11/1996  Gantt .................................. 395/133

*Primary Examiner*—Phu K. Nguyen
*Attorney, Agent, or Firm*—Staas & Halsey

[57] ABSTRACT

A graphic display apparatus for rotating a three-dimensional figure about the three axes of the Cartesian coordinate system has a graphic information storing unit for storing graphic information of a three-dimensional object to be displayed, a rotative action indicating unit for indicating rotative actions to rotate the three-dimensional object being displayed about the three axes, a display coordinate calculating unit for calculating coordinates of the three-dimensional object after it is rotated, a rotational angle calculating unit for calculating rotational angles of the three-dimensional object after it is rotated, and a display unit for displaying the three-dimensional object after it is rotated and the calculated rotational angles. The rotational angle calculating unit calculates the rotational angles of the three-dimensional object rotated by the rotative action, as rotational angles from the initial state of the three-dimensional object in a predetermined sequence of three rotative actions. This arrangement allows the operator to subsequently reconstruct the desired rotated state of the displayed three-dimensional figure without concern over the contents and sequence of rotative actions that have already been made, simply by entering the calculated rotational angles successively in a given sequence from the initial state.

3 Claims, 5 Drawing Sheets

GRAPHIC DISPLAY APPARATUS

BACKGROUND OF THE INVENTION

(1) Field of the Invention

The present invention relates to a graphic display apparatus, and more particularly to a graphic display apparatus for subsequently reconstructing the desired rotated state of a displayed three-dimensional object after the operator has made rotative actions to rotate the displayed three-dimensional object.

(2) Description of the Related Art

It has heretofore been customary to display three-dimensional objects on two-dimensional graphic display apparatus. It has also been the usual practice to rotate a three-dimensional object on a two-dimensional display apparatus for the operator to observe the structural arrangement of the object. Such a displayed three-dimensional object can be rotated as desired by the operator using buttons that are provided for rotating displayed objects on the graphic display apparatus.

Generally, the operator of a computer rotates a three-dimensional figure displayed on a graphic display apparatus controlled by the computer by giving three Euler's angles to the computer. The initial state of a three-dimensional figure before it is rotated and the rotated state of the three-dimensional figure can be defined uniquely using Euler's angles. However, the operator usually finds it difficult to intuitively find Euler's angles for transforming a displayed three-dimensional figure from its initial state before being rotated to a desired rotated state. It is known that rotations about the three axes of the rectangular Cartesian coordinate system are recognizable most easily by human beings.

There are more than one sequence of rotative actions available for the operator to achieve the desired rotated state of a displayed three-dimensional figure from its initial state through rotations about the three axes of the rectangular Cartesian coordinate system. Specifically, the operator may achieve the desired rotated state of a displayed three-dimensional figure by rotating the figure about the X-, Y-, Z-axes successively in a sequence of rotative actions, e.g., first about the X-axis, then about the Y-axis, and finally about the Z-axis. Alternatively, the operator may rotate the figure about these axes successively in any of other sequences of rotative actions. Further alternatively, the operator may rotate the figure a plurality of times about each of these axes in any of available sequences of rotative actions. The operator can achieve the desired rotated state of the displayed three-dimensional figure no matter which sequence of rotative actions he may follow for rotating the figure about the axes.

To reconstruct a three-dimensional figure in the previously achieved rotated state again from the initial state, it is necessary to record the previously effected rotations, i.e., the axes and the rotational angles in their proper sequences, and carry out the recorded rotations again. Such a process is usually very complex to perform. The complexities of the process manifest themselves particularly when the three-dimensional figure is displayed on a graphic display apparatus and rotated to vary the displayed figure, for it is the general practice for the operator to repeat trial-and-error efforts to rotate a displayed three-dimensional figure a plurality of times while confirming the rotated figure on the graphic display apparatus until the displayed figure reaches the desired rotated state from its initial state.

Recent graphic display apparatus or graphic display software capable of rotating a three-dimensional object and displaying the rotated three-dimensional object often employ a mouse to control the rotation of the three-dimensional object comparatively easily.

With the conventional graphic display apparatus, however, more than one sequence of rotational operations are available for the operator to achieve the desired rotated state of a displayed three-dimensional figure from its initial state, as described above. Rotational angles about the axes from the initial state of the three-dimensional figure are not displayed as they are insignificant in the rotating procedure. The operator repeats rotations of a displayed three-dimensional figure on a graphic display apparatus until it reaches a desired rotated state, then turns off the graphic display apparatus, and thereafter turns on the graphic display apparatus again and tries to reconstruct the rotated three-dimensional figure. In such a case, however, the operator finds it difficult to reconstruct the rotated three-dimensional figure on the graphic display apparatus.

SUMMARY OF THE INVENTION

It is therefore an object of the present invention to provide a graphic display apparatus which allows the operator to rotate a three-dimensional figure about the three axes of the Cartesian coordinate system and also to subsequently reconstruct the desired rotated state of the displayed three-dimensional figure without concern over the contents and sequence of rotative actions that have already been made.

To achieve the above object, there is provided in accordance with the present invention a graphic display apparatus for displaying a three-dimensional object which can be rotated about a fixed point as an origin, comprising graphic information storing means for storing graphic information of a three-dimensional object to be displayed, rotative action indicating means for indicating rotative actions to rotate the three-dimensional object being displayed about three axes of a Cartesian coordinate system, display coordinate calculating means for calculating Coordinates of the three-dimensional object after the three-dimensional object is rotated by the indicated rotative actions, rotational angle calculating means for calculating rotational angles of the three-dimensional object rotated by the rotative actions, as rotational angles from an initial state of the three-dimensional object prior to the rotative actions, in a predetermined sequence of at most one rotative action about each of the three axes, and display means for displaying the three-dimensional object at the coordinates that have been calculated by the display coordinate calculating means, and the rotational angles from the initial state which have been calculated by the rotational angle calculating means.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
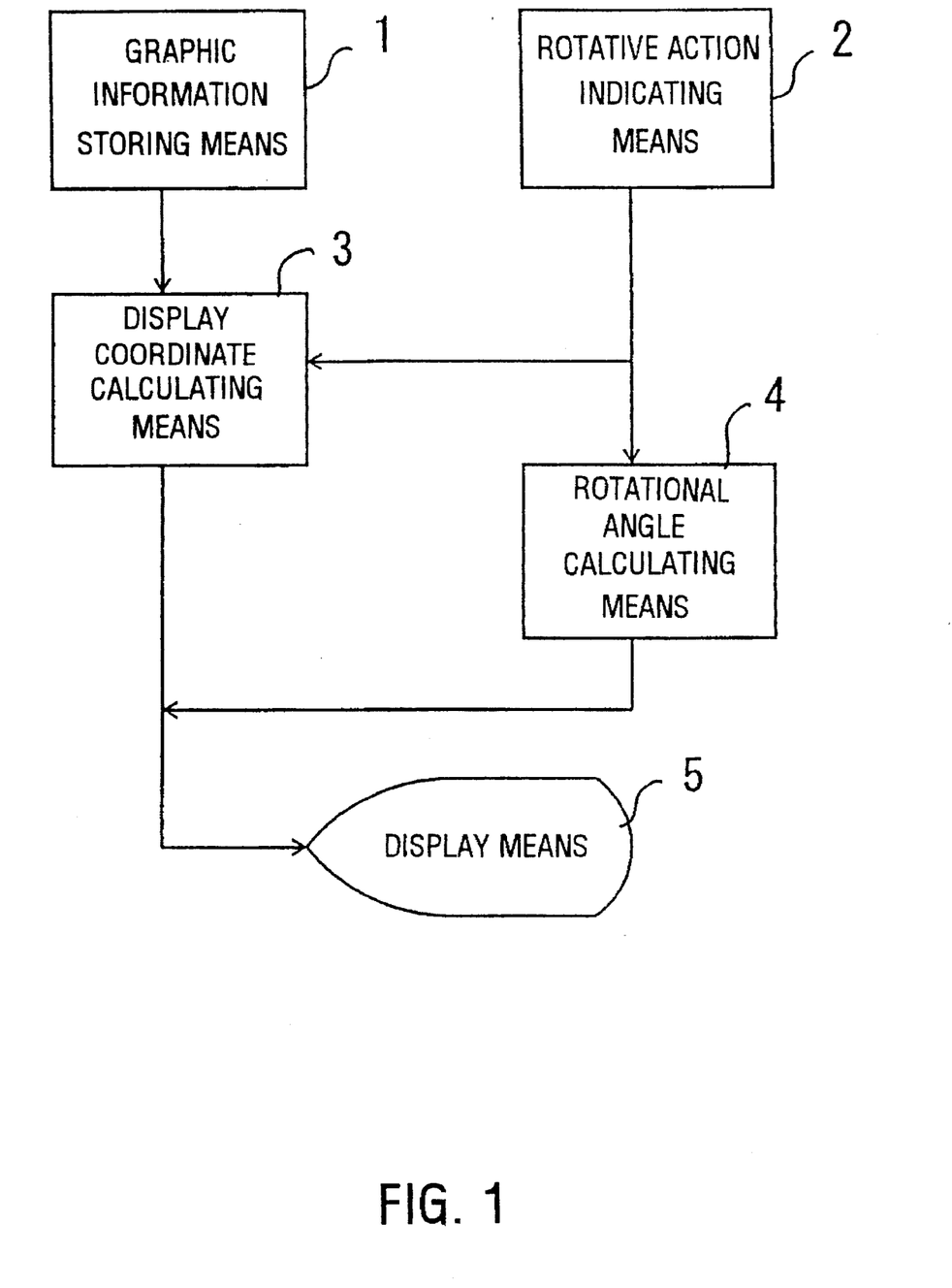
FIG. 1 is a block diagram illustrative of the principles of a graphic display apparatus according to the present invention.

As shown in FIG. 1, a graphic display apparatus according to the present invention has a graphic information storing means 1 for storing graphic information of a three-dimensional object to be displayed. The graphic display apparatus also has a rotative action indicating means 2 for indicating rotative actions to rotate a three-dimensional object, whose graphic information is read from the graphic information storing means 1 and displayed, about the three axes of the Cartesian coordinate system. Preferably, the rotative action indicating means 2 has six buttons for rotating a displayed object in positive and negative directions about the three axes. The rotative action indicating means 2 also has a timer means which starts to operate for measuring time in response to the indication of a rotative action, and a means for reducing, at an accelerated rate, a time interval at which rotative action indications are outputted by rotative actions if the indication of a rotative action is continued even after the timer means reaches a time-out condition. While any one of the buttons is being continuously pressed, therefore, the rotative action indicating means 2 progressively increases the number of times that a rotative action is indicated per unit time after elapse of a certain period of time, thereby allowing the operator to enter easily a large numerical value for a rotational angle.

The graphic display apparatus further includes a display coordinate calculating means 3 and a rotational angle calculating means 4 which are connected to the output of the rotative action indicating means 2. Each time the rotative action indicating means 2 indicates a rotative action, it transmits the indicated rotative action to the display coordinate calculating means 3 and the rotational angle calculating means 4. In response to the indicated rotative action from the rotative action indicating means 2, the display coordinate calculating means 3 calculates the coordinates of a three-dimensional object after it is rotated by the indicated rotative action. In response to the indicated rotative action from the rotative action indicating means 2, the rotational angle calculating means 4 calculates the rotational angles of a three-dimensional object rotated by the rotative action, as rotational angles from the initial state of the three-dimensional object in a predetermined sequence of three rotative actions.

The graphic display apparatus also has a display means 5 connected to the outputs of the display coordinate calculating means 3 and the rotational angle calculating means 4. The display means 5 displays a three-dimensional object at the coordinates that have been calculated by the display coordinate calculating means 3, and also displays the numerical values of the rotational angles from the initial state which have been calculated by the rotational angle calculating means 4.

The graphic display apparatus shown in FIG. 1 operates as follows: First, the graphic information of a three-dimensional object is read from the graphic information storing means 1 and displayed by the display means 5. At this time, the displayed figure of the three-dimensional object is in a rotated state according to the graphic information, i.e., in an initial state, and all rotational angles are "0.0". Each time a rotative action is indicated by the rotative action indicating means 2, the display coordinate calculating means 3 calculates the coordinates of the three-dimensional object after it is rotated, and the display means 5 displays the figure of the three-dimensional object at the calculated coordinates. The rotational angle calculating means 4 also calculates the rotational angles of the rotated figure, and the display means 5 displays the calculated rotational angles. The rotational angles are displayed as rotational angles from the initial state of the three-dimensional object prior to being rotated, in a predetermined sequence of three rotative actions.

Figure 2:
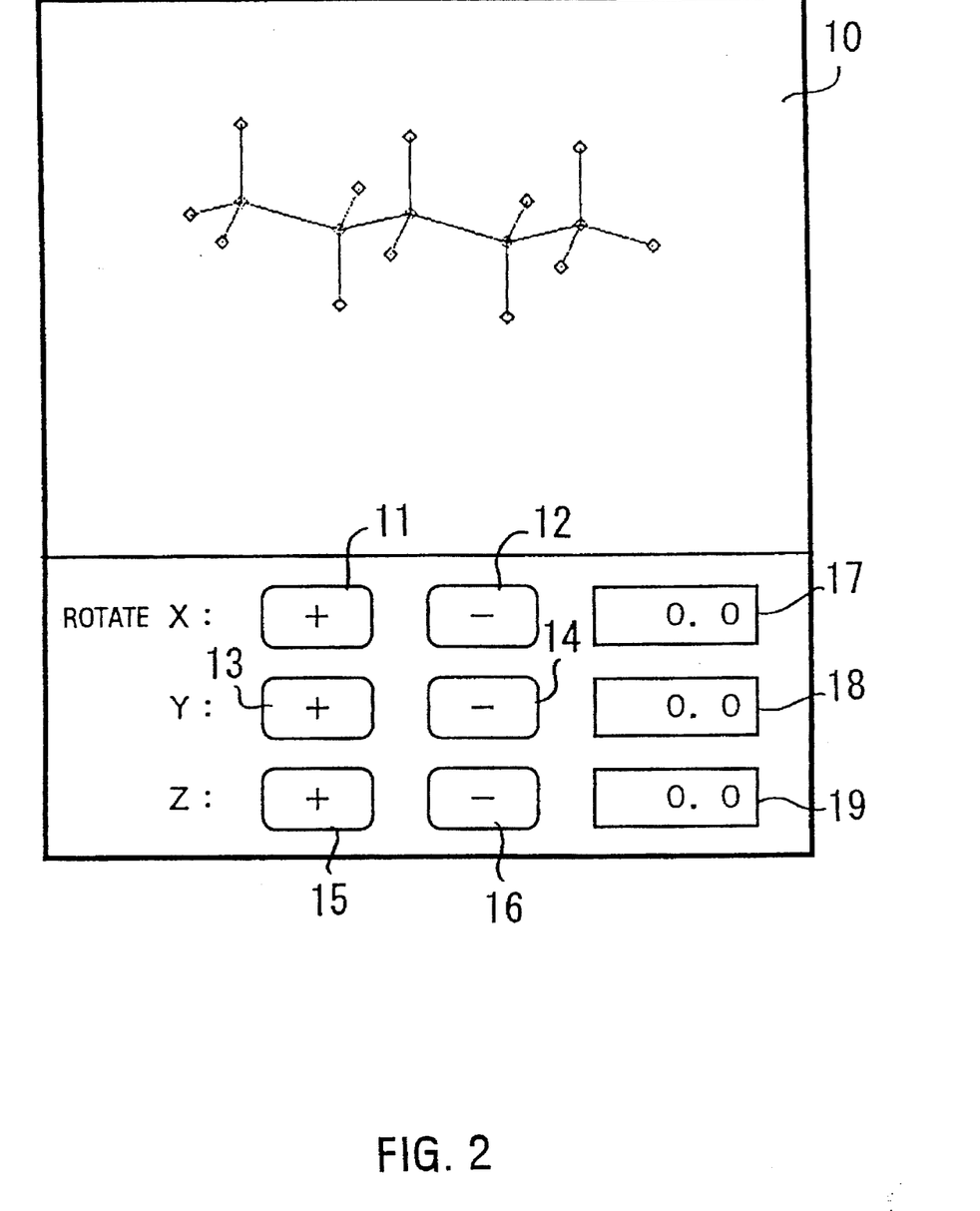
FIG. 2 is a view of a display screen of the graphic display apparatus according to the present invention.

FIG. 2 shows a display screen of the graphic display apparatus according to the present invention.

The graphic display apparatus according to the present invention is preferably applied for use in a workbench "MASPHYC/WB" (Material design System by means of computational PHYsics and Chemistry/Work Bench) for a molecular dynamic simulator oriented to material design. Such an application will be described below.

In FIG. 2, the display screen of the graphic display apparatus displays a molecular information database window 10 for displaying the structure of a certain molecule (n-pentane in the illustrated embodiment). The display screen also displays, below the molecular information database window 10, six rotative action buttons 11, 12, 13, 14, 15, 16 for indicating rotative actions to rotate the molecular structure displayed in the molecular information database window 10, and three rotational angle display units 17, 18, 19 for displaying rotational angles of the displayed molecular structure from its initial state.

The rotative action buttons 11, 13, 15 are marked with "+" and correspond to the positive direction in a right-hand rectangular coordinate system, and the rotative action buttons 12, 14, 16 are marked with "−" and correspond to the negative direction in the right-hand rectangular coordinate system. Each of these six rotative action buttons 11, 12, 13, 14, 15, 16 can be activated to indicate a rotative action when a mouse cursor is positioned on the desired rotative action button and clicked. Each time a rotative action button is clicked once, the molecular structure displayed in the molecular information database window 10 is rotated through 0.1 degree, for example. When a rotative action button is continuously pressed, the displayed molecular structure is continuously rotated. The rotation of the displayed molecular structure can be accelerated at a rate depending on the period of time for which the rotative action button is continuously pressed. If a known rotational angle from the initial state to the desired rotated state is to be reconstructed, then this accelerated rotation capability allows the operator to reach the desired rotated state quickly through the rotational angle which may be of a large numerical value.

The rotational angle display units 17, 18, 19 display respective numerical values with respect to rotations which are carried out about the respective X-, Y-, and Z-axes by respective rotative actions. When the figure of a molecular structure to be displayed is selected and first displayed in the molecular information database window 10, each of these numerical values represents "0.0", indicating the initial state of the displayed figure before it is rotated. Each time rotative actions are inputted by the rotative action buttons, numerical values indicative of the rotative actions from the initial state are calculated and displayed respectively on the rotational angle display units 17, 18, 19. When the displayed numerical values are inputted successively in the sequence of X-, Y-, and Z-axes, the numerical values represent rotational angles with which the rotated state of the displayed figure can be reconstructed. The reason for this is as follows: When a figure is rotated about the X-axis, only the numerical value about the X-axis changes. When the figure is rotated about the Y- or Z-axis, however, the numerical Value about the Y- or Z-axis changes, and also the numerical values about the X- and Z-axes or the X- and Y-axes change. Therefore, the desired rotated state cannot uniquely be achieved unless the sequence of rotative actions as well as the rotational angles is followed.

Figure 3:
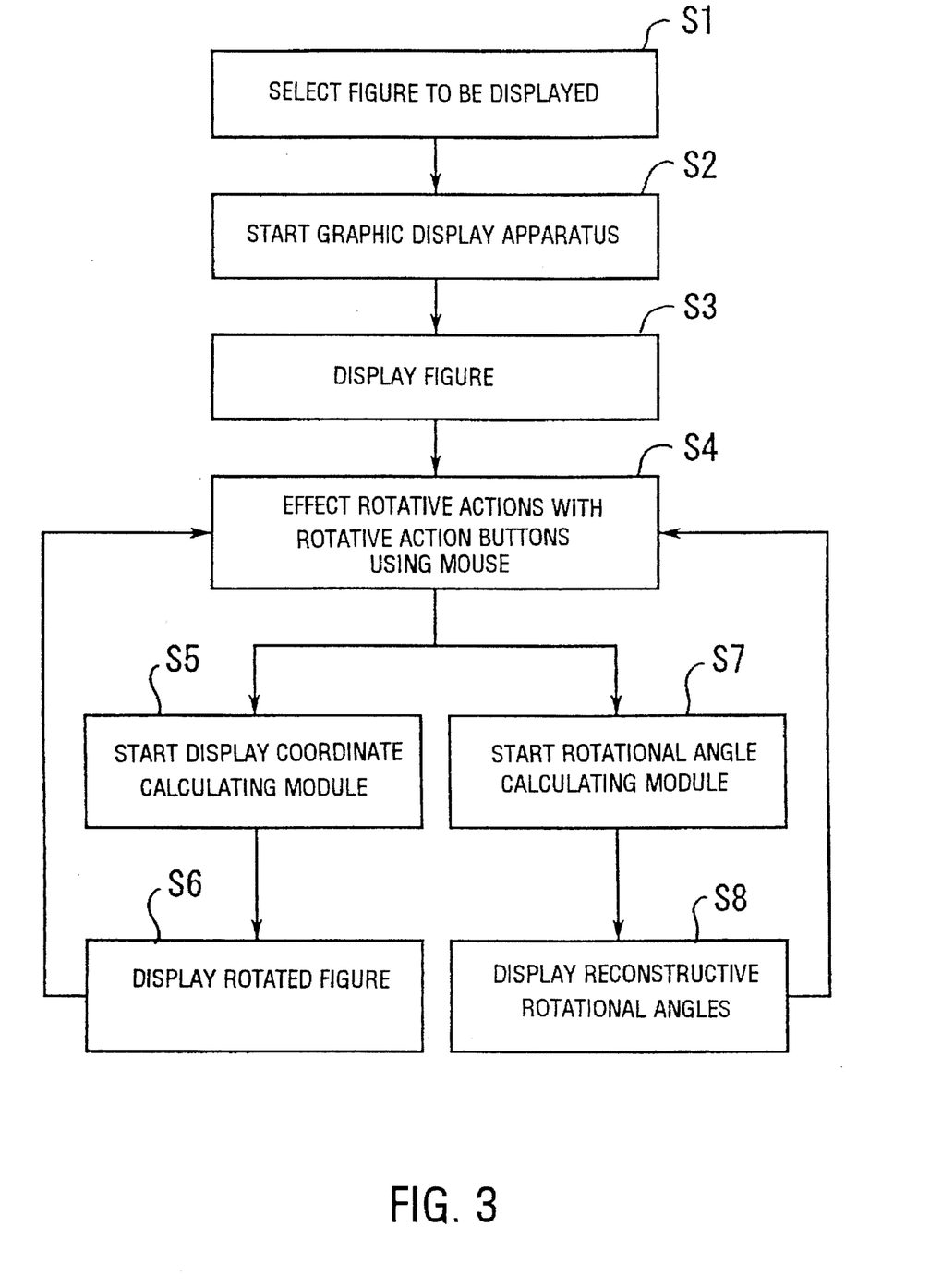
FIG. 3 is a flowchart of an operation sequence of the graphic display apparatus according to the present invention.

FIG. 3 shows an operation sequence of the graphic display apparatus according to the present invention.

For operating the graphic display apparatus, a graphic information file stored in the form of three-dimensional coordinates is selected to select to the figure of a molecular structure to be displayed in a step S1. Then, the graphic display apparatus is started in a step S2, and the figure of the molecular structure is displayed on the display screen of the graphic display apparatus in a step S3. At this time, the rotational angle display units 17, 18, 19 display rotational angles "0.0" indicative of the initial rotated state. When the operator effects rotative actions with the rotative action buttons using the mouse cursor in a step S4, a display coordinate calculating module (corresponding to the display coordinate calculating means 3) is started to calculate coordinates for displaying the figure based on the rotative actions in a step S5, and the figure rotated to the calculated coordinates is displayed on the display screen of the graphic display apparatus in a step S6. Concurrent with this, a rotational angle calculating module (corresponding to the rotational angle calculating means 4) is started to calculate rotational angles from the initial state which depend on the rotative actions in a step S7, and the calculated rotational angles, i.e., reconstructive rotational angles are displayed on the rotational angle display units 17, 18, 19 in a step S8.

A process of calculating rotational angles with the rotational angle calculating module or means will be described below. Prior to the process of calculating rotational angles, a set of rotations capable of uniquely determining rotational angles will first be described below. Three numbers indicative of rotational angles about the respective axes are mapped onto a 3×3 matrix representative of a three-dimensional rotation, and if the correspondence of the mapping is limited to a certain set, then there can be obtained a relationship which is both surjective and injectire. If a relationship is both surjective and injective, then any optional rotation corresponds uniquely to a set of rotational angles about the respective axes, and an inverse mapping exists. The existence of an inverse mapping g used in the calculation of rotational angles will first be described.

A mapping:

$$f: U(1) \times U(1) \times U(1) \to SO(3) \quad (1)$$

$$(e^{i\gamma}, e^{i\beta}, e^{i\alpha}) \xrightarrow{d} \quad (2)$$

$$\begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\alpha & -\sin\alpha \\ 0 & \sin\alpha & \cos\alpha \end{bmatrix}$$

is surjective, but not injectire. Therefore, there is no unique way of expressing a rotation $0$ with the product of the above three 3×3 matrixes using a set of three real numbers:

$$[0, 2\pi)^3 (\alpha, \beta, \gamma). \quad (3)$$

However, if $$X \equiv U^+(1) \times U^0(1) \times U(1) \quad (4)$$
$$\cup \{1\} \times \{+i\} \times U(1)$$
$$\cup \{1\} \times \{-i\} \times U(1),$$

then a restriction of f to X:

$$f\upharpoonright X: X \to SO(3) \quad (5)$$

can be proved to be both surjective and injectire. Consequently, an inverse mapping g:

$$g \equiv (f\upharpoonright X)^{-1}: SO(3) \to X \quad (6)$$

exists, and $$\forall O \in SO(3), f(g(O)) = O. \quad (7)$$

In the equation (4), $$U^+(1) = \{e^{i\theta} | 0 \leq \theta < \pi\}, \quad (8)$$

$$U^0(1) = U(1) - \{\pm i\}. \quad (9)$$

Consequently, with respect to any optional rotation O, the following formula:

$$X(e^{i\gamma}, e^{i\beta}, e^{i\alpha}) \quad (10)$$

is uniquely determined, and the rotation O can be expressed as follows:

$$O = \quad (11)$$

$$\begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\alpha & -\sin\alpha \\ 0 & \sin\alpha & \cos\alpha \end{bmatrix}$$

In this embodiment, the inverse mapping g: $SO(3) \to X$ is arranged, and the angles ($\alpha$, $\beta$, $\gamma$) are calculated from the rotation O.

The manner in which the inverse mapping g: $SO(3) \to X$ is arranged will be described below.

When the rotation $O \in SO(3)$ is expressed by a real 3×3 matrix:

$$O = \begin{bmatrix} A & B & c \\ D & E & F \\ G & H & I \end{bmatrix}, \quad (12)$$

the rotation O belongs to either one of the following four subsets:

$$Y_1 \equiv \{O \in SO(3) | G^2 \neq 1, D \neq 0\} \quad (13)$$

$$Y_2 \equiv \{O \in SO(3) | G^2 \neq 1, D = 0\} \quad (14)$$

$$Y_+ \equiv \{O \in SO(3) | G = 1\} \quad (15)$$

$$Y_- \equiv \{O \in SO(3) | G = -1\} \quad (16)$$

In each of the above subsets, the inverse mapping g is defined as follows:

when (a) $O \in Y_1$, $$g(O) \triangleq (A/k + i \cdot D/k, k - i \cdot G, I/k + i \cdot H/k) \quad (17)$$

where $k \equiv \text{sgn}(D) (1-G^2)^{1/2} \neq 0$, when (b) $O \in Y_2$, $$g(O) \cdot d(1, A-i \cdot G, I/A+i \cdot H/A), \quad (18)$$

when (c) $O \in Y-$, $$g(O) \cdot d(1, -i, E-i \cdot B), \text{ and} \quad (19)$$

when (d) $O \in Y-$, $$g(O) \cdot d(1, i, E+i \cdot B) \quad (20)$$

where $i$ is an imaginary unit, $\text{sgn}(D)$ is $+1$ when $D$ is positive, 0 when $D$ is 0, and $-1$ when $D$ is negative. $[0, 2\pi)^3$ ($\alpha\beta\gamma$) exists for each of the above four cases, and can be expressed by:

$$g(O) = (e^{i\gamma}, e^{i\beta}, e^{i\alpha}) \quad (21)$$

For example, when $O \in Y_1$, $$|A/k + i \cdot D/k|^2 = (A/k)^2 + (D/k)^2$$
$$= (A^2 + D^2)/|1 - G^2|$$
$$= (1 - G^2)/(1 - G^2) = 1$$

(from $A^2 + D^2 + G^2 = 1$, $1 - G^2 = A^2 + D^2 > 0$). Therefore, $\gamma \in [0, 2\pi)$ exists, and $$A/k + i \cdot D/k = e^{i\gamma}. \quad (23)$$

Similarly, $\alpha \in [0, 2\pi)$, $\beta \in [0, 2\pi)$ exist, and $k - i \cdot G = e^{i\beta}$ $$I/k + i \cdot H/k = e^{i\alpha}. \quad (24)$$

To determine the specific value of $\gamma$, the equations $A/k = \cos\gamma$, $D/k = \sin\gamma$ may be solved. The angles $\beta$, $\alpha$ may be determined similarly. In this manner, the angles ($\alpha$, $\beta$, $\gamma$) can be calculated from the rotation $0$.

Figure 4:
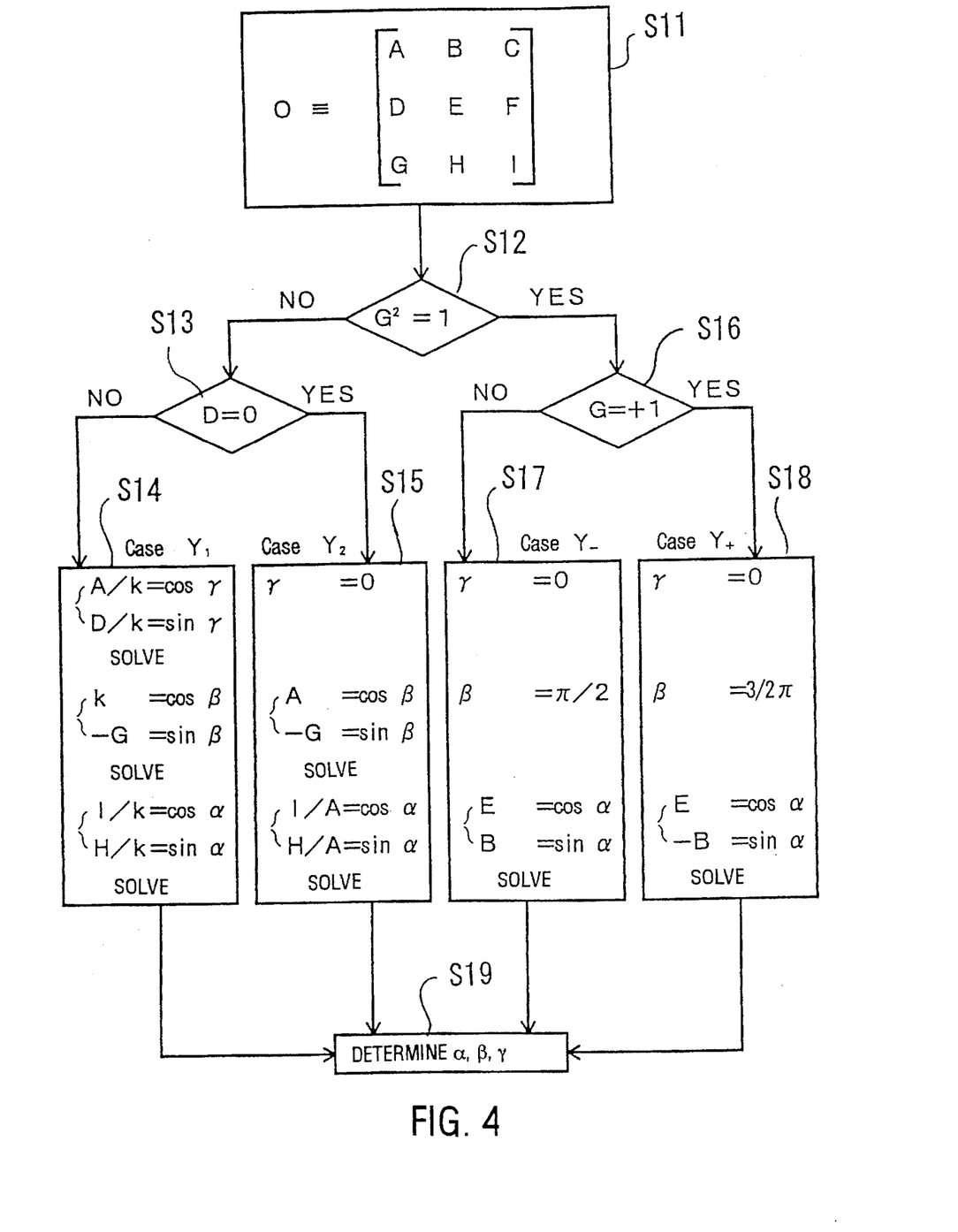
FIG. 4 is a flowchart of a calculating process carried out by a rotational angle calculating means of the graphic display apparatus according to the present invention.

FIG. 4 shows a calculating process carried out by the rotational angle calculating means of the graphic display apparatus.

A certain rotated state can be expressed by a 3×3 matrix. When a certain rotative action is applied to the rotated state, multiplying the 3×3 matrix by a rotative matrix, their product can also be expressed by a 3×3 matrix. The calculating process shown in FIG. 4 is started in a step S11 when the rotated state is expressed by the latter 3×3 matrix. Then, the calculating process determines which one of the four subsets the rotation $0$ belongs to.

First, a step S12 determines whether $G^2 = 1$ or not. If $G^2 \ne 1$, then a step S13 determines whether $D = 0$ or not. If $D \ne 0$, then the rotation $O$ belongs to $Y_1$, and if $D = 0$, then the rotation $O$ belongs to $Y_2$. If the rotation $O$ belongs to $Y_1$, then the rotational angles $\alpha$, $\beta$, $\gamma$ are calculated in a step S14. If the rotation $O$ belongs to $Y_2$, then the rotational angles $\alpha$, $\beta$, $\gamma$ are calculated in a step S15.

If $G^2 = 1$ in the step S12, then a step S16 determines whether $G = +1$ or not. If $G \ne +1$, then the rotation $O$ belongs to $Y-$, and if $G = +1$, then the rotation $O$ belongs to $Y+$. If the rotation $O$ belongs to $Y-$, then the rotational angles $\alpha$, $\beta$, $\gamma$ are calculated in a step S17. If the rotation $O$ belongs to $Y+$, then the rotational angles $\alpha$, $\beta$, $\gamma$ are calculated in a step S18.

The rotational angles $\alpha$, $\beta$, $\gamma$ are determined in a step S19 according to the calculations effected in the steps S14, S15, S17, S18.

In this manner, when rotative actions are effected on the figure of a three-dimensional object, rotational angles are calculated, and the figure of the three-dimensional object after the rotative actions are applied and the calculated rotational angles from the initial state of the figure are displayed on the display screen. When the figure in the desired rotated state is obtained, the displayed rotational angles are recorded in some way, so that the rotated state will be reconstructed subsequently. Specifically, since the displayed rotational angles $\alpha$, $\beta$, $\gamma$ are rotational angles achieved when three rotative actions are effected in a predetermined sequence about the respective axes from the initial state of the figure, when the figure in the desired rotated state is to be reconstructed at a later time, the rotative action buttons are operated to achieve the recorded rotational angles in the predetermined sequence about the respective axes from the initial state of the figure, i.e., first about the X-axis, then about the Y-axis, and finally about the Z-axis. For example, if the rotational angles in the desired rotated state are $\alpha = 10.0$ degrees, $\beta = 20.0$ degrees, and $\gamma = 40.0$ degrees, then a rotative action is effected first through 10.0 degrees about the X-axis, then through 20.0 degrees about the Y-axis, and finally through 40.0 degrees about the Z-axis.

Figure 5:
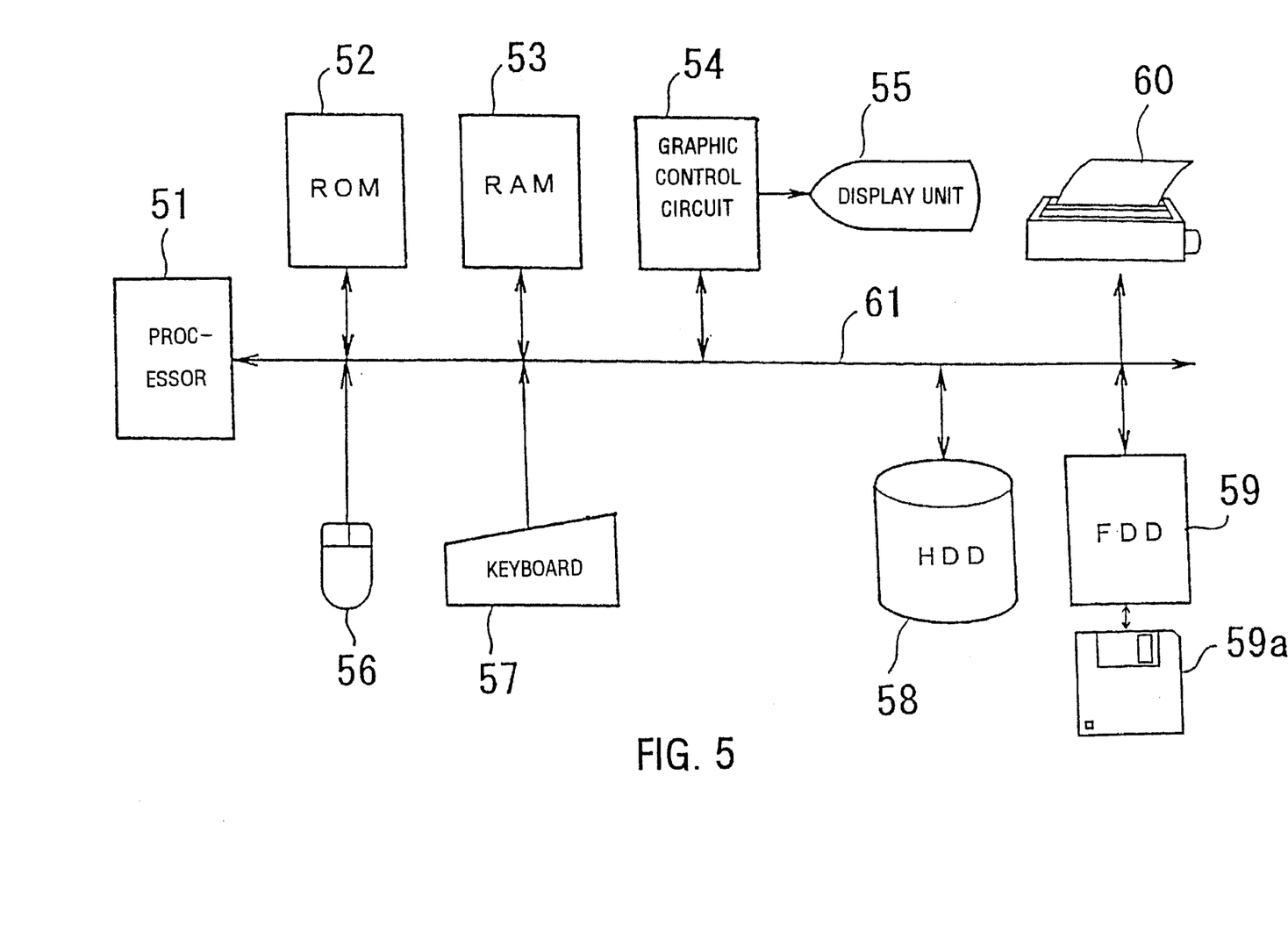
FIG. 5 is a block diagram of a hardware arrangement of a workstation which is used to implement the graphic display apparatus according to the present invention.

FIG. 5 shows a hardware arrangement of a workstation which is used to implement the graphic display apparatus according to the present invention. As shown in FIG. 5, the workstation comprises a processor 51, a read-only memory (ROM) 52, a random-access memory (RAM) 53 as a main memory, a graphic control circuit 54, a display unit 55, a mouse 56, a keyboard 57, a hard disk drive (HDD) 58, a floppy disk drive (FDD) 59, and a printer 60. These components of the workstation are interconnected by a bus 61.

The processor 51 controls the workstation in its entirety. The read-only memory 52 stores a program required to start the workstation. The main memory 53 serves to stores a system program, an application program for displaying the figure of a three-dimensional object and rotating the displayed figure, and graphic data of a three-dimensional object being displayed, e.g., a molecular structure.

The graphic control circuit 54 has a video memory, and serves to converts graphic information loaded in the main memory 53 and information from rotative action buttons into display signals, and sends the display signals to the display unit 55. Based on the received display signals, the display unit 55 displays a graphic display window, a graphic pattern, and rotative action buttons.

The mouse 56 is a pointing device for moving a mouse cursor displayed on the display screen of the display unit 55, positioning the mouse cursor on any one of the rotative action buttons for coordinates to be rotated, and rotating a displayed figure in rotational angle units or increasing a rotational angle at an accelerated rate when a button on the mouse 56 is pressed. The keyboard 57 is used to enter graphic information to be displayed.

The hard disk drive 58 stores the system program, the application program, and graphic information files. The floppy disk drive 59 is an external storage device for transferring graphic information files from a floppy disk 59a into the hard disk drive 58 and storing graphic information files from the hard disk drive 58 in the floppy disk 59a.

Displayed data indicative of the rotated figure of a three-dimensional object can be transmitted to the printer 60, and printed on a sheet of paper.

With the present invention, as described above, the rotational angles through which the figure of a three-dimensional object is rotated are displayed as rotational angles about the respective axes from the initial state of the three-dimensional object in a predetermined sequence of three rotafire actions about the respective axes. Therefore, the desired rotated state of the figure can be reconstructed without concern at all over the contents and sequence of rotative actions that have already been made.

In the illustrated embodiment described above, the rotated state of the displayed figure of a three-dimensional object is reconstructed by a predetermined sequence of rotative actions first about the X-axis, then about the Y-axis, and finally about the Z-axis. The displayed three-dimensional object is a molecular structure. Rotative actions are effected with the buttons displayed on the display screen. The magnitude of a rotational angle about an axis in one rotative action is recognized from the displayed angle about the axis as it changes from time to time. However, the present invention is not limited to the above details. For example, the magnitude of a rotational angle about an axis in one rotative action may be entered directly as a numerical value.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A graphic display apparatus for displaying a three-dimensional object which can be rotated about a fixed point as an origin, comprising:

graphic information storing means for storing graphic information of a three-dimensional object to be displayed;

rotative action indicating means for indicating rotative actions to rotate the three-dimensional object being displayed about three axes of a Cartesian coordinate system;

display coordinate calculating means for calculating coordinates of the three-dimensional object after said three-dimensional object is rotated by the indicated rotative actions;

rotational angle calculating means for calculating rotational angles of said three-dimensional object rotated by the rotative actions, as rotational angles from an initial state of the three-dimensional object prior to the rotative actions, in a predetermined sequence of at most one rotative action about each of said three axes; and display means for displaying the three-dimensional object at the coordinates that have been calculated by said display coordinate calculating means, and the rotational angles from the initial state which have been calculated by said rotational angle calculating means.

2. A graphic display apparatus according to claim 1, wherein said rotative action indicating means has six buttons operable for rotating said three-dimensional object in positive and negative directions about said three axes.

3. A graphic display apparatus according to claim 2, wherein said rotative action indicating means comprises means for progressively increasing the number of times that a rotative action is indicated per unit time after elapse of a certain period of time while each of said six buttons are being continuously operated.

* * * * *